US008701763B2

(12) United States Patent
Baran, Jr. et al.

(10) Patent No.: US 8,701,763 B2
(45) Date of Patent: Apr. 22, 2014

(54) METHODS FOR TREATING HYDROCARBON-BEARING FORMATIONS HAVING BRINE

(75) Inventors: Jimmie R. Baran, Jr., Prescott, WI (US); Gregory D. Clark, Silver Springs, MD (US); George G.I. Moore, Afton, MN (US); Michael S. Terrazas, Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 634 days.

(21) Appl. No.: 12/990,991

(22) PCT Filed: Apr. 27, 2009

(86) PCT No.: PCT/US2009/041779
§ 371 (c)(1),
(2), (4) Date: Nov. 4, 2010

(87) PCT Pub. No.: WO2009/137285
PCT Pub. Date: Nov. 12, 2009

(65) Prior Publication Data
US 2011/0056689 A1    Mar. 10, 2011

Related U.S. Application Data

(60) Provisional application No. 61/050,471, filed on May 5, 2008.

(51) Int. Cl.
*E21B 43/25* (2006.01)
*E21B 43/26* (2006.01)
*E21B 43/267* (2006.01)
*E21B 43/32* (2006.01)
*C09K 8/60* (2006.01)
*C09K 8/62* (2006.01)

(52) U.S. Cl.
USPC ............... 166/263; 166/280.1; 166/305.1; 166/308.1; 166/400; 507/221; 507/260; 507/261; 507/266

(58) Field of Classification Search
None
See application file for complete search history.

(56) References Cited

U.S. PATENT DOCUMENTS 3,060,210 A * 10/1962 De Groote et al. ........... 507/244
3,278,352 A    10/1966 Erickson
(Continued)

FOREIGN PATENT DOCUMENTS

EP    1311637    5/2003
GB    2031482    4/1980
(Continued)

OTHER PUBLICATIONS

Adibhatla, "Effect of Surfactants on Wettability of Near-wellbore Regions of Gas Reservoirs", Journal of Petroleum Science and Engineering, 2006, vol. 52, pp. 227-236.
(Continued)

*Primary Examiner* — George Suchfield

(57) ABSTRACT

Method of treating a hydrocarbon-bearing formation having brine and treated hydrocarbon-bearing formations. The method includes contacting a hydrocarbon-bearing formation with a composition comprising solvent and a polymer. The polymer comprises divalent units represented by formula: (formula I); and a plurality of alkyleneoxy groups. In some embodiments, the solvent at least one of solubilizes or displaces the brine in the formation. In some embodiments, the solvent includes at least one of a polyol or polyol ether independently having from 2 to 25 carbon atoms and at least one of water, a monohydroxy alcohol, an ether, or a ketone, wherein the monohydroxy alcohol, the ether, and the ketone each independently have up to 4 carbon atoms. Hydrocarbon-bearing formations and proppants treated with the polymer are also disclosed.

20 Claims, 2 Drawing Sheets

(56) References Cited

U.S. PATENT DOCUMENTS

| | | |
|---|---|---|
| 3,311,167 A | 3/1967 | O'Brien |
| 3,394,758 A | 7/1968 | Terry |
| 3,653,442 A | 4/1972 | Ross |
| 3,787,351 A | 1/1974 | Olson |
| 3,902,557 A | 9/1975 | Shaughnessy |
| 4,018,689 A | 4/1977 | Thompson |
| 4,200,154 A | 4/1980 | Tate |
| 4,329,236 A | 5/1982 | Alford |
| 4,432,882 A | 2/1984 | Raynolds et al. |
| 4,440,653 A | 4/1984 | Briscoe et al. |
| 4,460,791 A | 7/1984 | Cooke |
| 4,557,837 A | 12/1985 | Clark, III et al. |
| 4,565,639 A | 1/1986 | Penny et al. |
| 4,594,200 A | 6/1986 | Penny |
| 4,609,477 A | 9/1986 | Crema |
| 4,702,849 A | 10/1987 | Penny |
| 4,753,740 A | 6/1988 | Marlett et al. |
| 4,767,545 A | 8/1988 | Karydas et al. |
| 4,769,160 A * | 9/1988 | Karydas .................. 507/205 |
| 4,817,715 A | 4/1989 | Peru |
| 4,823,873 A | 4/1989 | Karydas |
| 4,876,018 A * | 10/1989 | Karydas .................. 507/205 |
| 4,921,619 A | 5/1990 | Karydas |
| 4,923,009 A | 5/1990 | Watkins |
| 4,993,448 A | 2/1991 | Karydas et al. |
| 4,997,580 A | 3/1991 | Karydas et al. |
| 5,042,580 A | 8/1991 | Cullick et al. |
| 5,092,405 A | 3/1992 | Prukop |
| 5,129,457 A | 7/1992 | Sydansk |
| 5,186,257 A | 2/1993 | Stahl et al. |
| 5,247,993 A | 9/1993 | Sarem et al. |
| 5,310,002 A | 5/1994 | Blauch et al. |
| 5,358,052 A | 10/1994 | Gidley |
| 6,165,948 A | 12/2000 | Dewenter et al. |
| 6,182,759 B1 | 2/2001 | Burger |
| 6,206,102 B1 | 3/2001 | Pusch et al. |
| 6,225,263 B1 | 5/2001 | Collins et al. |
| 6,579,572 B2 | 6/2003 | Espin et al. |
| 6,660,693 B2 | 12/2003 | Miller et al. |
| 6,664,354 B2 | 12/2003 | Savu et al. |
| 6,689,854 B2 | 2/2004 | Fan et al. |
| 6,729,409 B1 | 5/2004 | Gupta et al. |
| 6,911,417 B2 | 6/2005 | Chan et al. |
| 6,945,327 B2 | 9/2005 | Ely et al. |
| 6,972,274 B1 | 12/2005 | Slikta et al. |
| 7,084,094 B2 | 8/2006 | Gunn et al. |
| 7,165,613 B2 | 1/2007 | Chan et al. |
| 7,307,118 B2 | 12/2007 | Xu et al. |
| 7,417,099 B2 | 8/2008 | Savu et al. |
| 7,585,817 B2 | 9/2009 | Pope et al. |
| 7,629,298 B2 | 12/2009 | Arco et al. |
| 7,772,162 B2 | 8/2010 | Pope et al. |
| 7,855,169 B2 | 12/2010 | Pope et al. |
| 8,043,998 B2 | 10/2011 | Pope et al. |
| 8,138,127 B2 | 3/2012 | Pope et al. |
| 8,176,981 B2 | 5/2012 | Savu |
| 8,236,737 B2 | 8/2012 | Fan |
| 8,261,825 B2 | 9/2012 | Pope et al. |
| 2003/0092581 A1 | 5/2003 | Crews |
| 2005/0244641 A1 | 11/2005 | Vincent |
| 2006/0045979 A1 | 3/2006 | Dams |
| 2006/0264334 A1 | 11/2006 | Gupta et al. |
| 2007/0015669 A1 | 1/2007 | Zhang |
| 2007/0029085 A1 | 2/2007 | Panga et al. |
| 2007/0225176 A1* | 9/2007 | Pope et al. .................. 507/221 |
| 2008/0051300 A1* | 2/2008 | Pope et al. .................. 507/226 |
| 2008/0051551 A1 | 2/2008 | Pope et al. |
| 2010/0152071 A1 | 6/2010 | Pope et al. |
| 2010/0181068 A1 | 7/2010 | Pope et al. |
| 2010/0224361 A1 | 9/2010 | Pope et al. |
| 2010/0270019 A1 | 10/2010 | Pope et al. |
| 2010/0270020 A1 | 10/2010 | Baran, Jr. |
| 2010/0270021 A1 | 10/2010 | Baran, Jr. |
| 2010/0276142 A1 | 11/2010 | Skildum et al. |
| 2010/0276149 A1 | 11/2010 | Pope et al. |
| 2010/0288498 A1 | 11/2010 | Moore et al. |
| 2010/0319920 A1* | 12/2010 | Pope et al. .................. 166/300 |
| 2011/0124532 A1 | 5/2011 | Maurer |
| 2011/0136704 A1 | 6/2011 | Sharma |
| 2011/0177983 A1 | 7/2011 | Baran, Jr. |
| 2011/0201531 A1 | 8/2011 | Sharma |
| 2011/0247822 A1 | 10/2011 | Dams |
| 2011/0247823 A1 | 10/2011 | Dams |
| 2012/0097393 A1 | 4/2012 | Dams |

FOREIGN PATENT DOCUMENTS

| | | |
|---|---|---|
| SU | 1706204 | 11/1994 |
| WO | WO 02/092660 | 11/2002 |
| WO | WO 2003/089540 | 10/2003 |
| WO | WO 2005/028589 | 3/2005 |
| WO | WO 2005/035936 | 4/2005 |
| WO | WO 2007/017806 | 2/2007 |
| WO | WO 2007/033489 | 3/2007 |
| WO | WO 2007/097975 | 8/2007 |
| WO | WO 2007/126431 | 11/2007 |
| WO | WO 2008/024865 | 2/2008 |
| WO | WO 2008/154279 | 12/2008 |

OTHER PUBLICATIONS

Al-Anazi et al., "A Successful Methanol Treatment in a Gas-Condensate Reservoir: Field Application", Mar. 2003, SPE 80901, Society of Petroleum Engineers Inc., pp. 1-9.

Clark, H. B., et al., "Use of Fluorochemical Surfactants in Nonaqueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of Petroleum Engineers Inc., 4 pages.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14. SPE 96184.

Kumar, "Improving the Gas and Condensate Relative Permeability Using Chemical Treatments", May 15-17, 2006, SPE Gas Technology Symposium, Calgary, Alberta, pp. 1-9. SPE 100529.

Li, K. et al., "Experimental Study of Wettability Alteration to Preferential Gas-Wetting in Porous Media and Its Effects", SPE Reservoir Eval. And Eng 3 (2), pp. 139-149. (undated).

McLeod, "The Use of Alcohol in Gas Well Stimulation", Nov. 10-11, 1966, SPE Eastern Regional Meeting, Columbus, Ohio, pp. 1-13. SPE 1663.

Noh et al., "Experimental Study of Wettability Alteration for Reservoir Rock", Project 3-Gas Condensate Reservoirs Part 2, Reservoir Engineering Research Institute, Apr. 1 - Jun. 30, 2005.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.

International Search Report for PCT/US2009/041779, mailed Jul. 30, 2009, 4 pp.

Written Opinion of the ISA for International Application No. PCT/US2009/041779, Jul. 30, 2009, 9 pp.

* cited by examiner

METHODS FOR TREATING HYDROCARBON-BEARING FORMATIONS HAVING BRINE

CROSS-REFERENCE TO RELATED APPLICATIONS

This application is a national stage filing under 35 U.S.C. 371 of PCT/US2009/041779, filed Apr. 27, 2009, which claims priority to U.S. Provisional Application Ser. No. 61/050,471, filed May 5, 2008, the disclosure of which is incorporated by reference in its entirety herein.

BACKGROUND

In the oil and gas industry, certain surfactants (including certain fluorinated surfactants) are known as fluid additives for various downhole operations (e.g., fracturing, waterflooding, and drilling). Often, these surfactants function to decrease the surface tension of the fluid or to stabilize foamed fluids.

Some hydrocarbon and fluorochemical compounds have been reported to modify the wettability of reservoir rock, which may be useful, for example, to prevent or remedy water blocking (e.g., in oil or gas wells) or liquid hydrocarbon accumulation (e.g., in gas wells) in the vicinity of the well bore (i.e., the near well bore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near well bore region of a hydrocarbon-bearing geological formation can inhibit or stop production of hydrocarbons from the well and hence are typically not desirable. Not all hydrocarbon and fluorochemical compounds, however, provide the desired wettability modification.

Solvent injection (e.g., injection of methanol) has been used to alleviate the problems of water blocking and condensate banking in gas wells, but this method may provide only a temporary benefit, and may not be desirable under some downhole conditions.

SUMMARY

In one aspect, the present disclosure provides a method of treating a hydrocarbon-bearing formation having brine, the method comprising:

contacting the hydrocarbon-bearing formation having brine with a composition comprising solvent and a polymer, wherein the polymer comprises:

a plurality of alkyleneoxy groups having from 2 to 4 carbon atoms; and divalent units represented by formula:

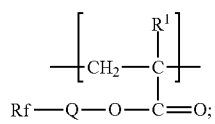

wherein

Rf is independently fluoroalkyl having up to 10 carbon atoms;

$R^1$ is independently hydrogen or alkyl having up to 4 carbon atoms; and

Q is independently alkylene having up to 10 carbon atoms and optionally interrupted by at least one —O—;

wherein the brine comprises at least 10,000 parts per million of dissolved salt (e.g., at least one of sodium chloride, calcium chloride, strontium chloride, magnesium chloride, potassium chloride, ferric chloride, ferrous chloride, or hydrates thereof), and wherein the solvent at least one of solubilizes or displaces the brine in the hydrocarbon-bearing formation.

In another aspect, the present disclosure provides a method of treating a hydrocarbon-bearing formation having brine, the method comprising:

contacting the hydrocarbon-bearing formation having brine with a composition comprising solvent and a polymer, wherein the polymer comprises:

a plurality of alkyleneoxy groups having from 2 to 4 carbon atoms; and divalent units represented by formula:

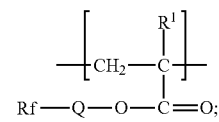

wherein

Rf is independently fluoroalkyl having up to 10 carbon atoms;

$R^1$ is independently hydrogen or alkyl having up to 4 carbon atoms; and

Q is independently alkylene having up to 10 carbon atoms and optionally interrupted by at least one —O—; and wherein the solvent comprises:

at least one of a polyol or polyol ether independently having from 2 to 25 carbon atoms; and at least one of water, a monohydroxy alcohol, an ether, or a ketone, wherein the monohydroxy alcohol, the ether, and the ketone each independently have up to 4 carbon atoms.

In some embodiments of the foregoing methods, the hydrocarbon-bearing formation is penetrated by a well bore, and a region near the well bore is contacted with a composition described herein. In some of these embodiments, the method further comprises obtaining hydrocarbons from the well bore after contacting the hydrocarbon-bearing formation with the composition.

In one aspect, the present disclosure provides a hydrocarbon-bearing formation treated according to a method disclosed herein.

In another aspect, the present disclosure provides a proppant particle comprising a surface, wherein at least a portion of the surface of the proppant particle is treated with a polymer comprising:

a plurality of alkyleneoxy groups having from 2 to 4 carbon atoms, divalent units represented by formula:

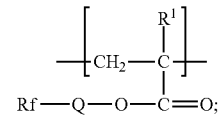

wherein

Rf is independently fluoroalkyl having up to 10 carbon atoms;

R¹ is independently hydrogen or alkyl having up to 4 carbon atoms; and

Q is independently alkylene having up to 10 carbon atoms and optionally interrupted by at least one —O—, and at least one divalent unit represented by formula:

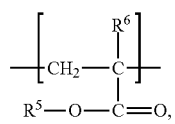

wherein each R⁵ is independently alkyl having up to 8 carbon atoms; and each R⁶ is independently hydrogen or methyl.

Methods according to the present disclosure are typically useful, for example, for increasing the productivity of oil and/or gas wells that have brine present in a near wellbore region of a hydrocarbon-bearing formation. The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)). The brine present in the formation may be from a variety of sources and may be at least one of connate water, flowing water, mobile water, immobile water, residual water from a fracturing operation or from other downhole fluids, or crossflow water (e.g., water from adjacent perforated formations or layers in the formation). In some embodiments, the brine is connate water. The term "brine" refers to water having at least one dissolved electrolyte salt therein (e.g., sodium chloride, calcium chloride, strontium chloride, magnesium chloride, potassium chloride, ferric chloride, ferrous chloride, and hydrates thereof). Unless otherwise specified, the brine may have any nonzero concentration, and which in some embodiments may be less than 1000 parts per million by weight (ppm), or at least 1000 ppm, at least 10,000 ppm, at least 20,000 ppm, 25,000 ppm, 30,000 ppm, 40,000 ppm, 50,000 ppm, 100,000 ppm, 150,000 ppm, or even at least 200,000 ppm.

The hydrocarbon-bearing formations that may be treated according to the present disclosure may be siliciclastic formations and may comprise at least one of shale, conglomerate, diatomite, sand, or sandstone. In some embodiments, the hydrocarbon-bearing formation is predominantly sandstone (i.e., at least 50 percent by weight sandstone). In some embodiments, methods according to the present disclosure can be practiced on carbonate (e.g., limestone) formations (e.g., fractured limestone formations containing proppants).

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list.

The term "hydrocarbon-bearing formation" includes both hydrocarbon-bearing formations in the field (i.e., subterranean hydrocarbon-bearing formations) and portions of such hydrocarbon-bearing formations (e.g., core samples).

"Alkyl group" and the prefix "alk-" are inclusive of both straight chain and branched chain groups, cyclic groups, and combinations thereof. Unless otherwise specified, alkyl groups herein have up to 20 carbon atoms. Cyclic groups can be monocyclic or polycyclic and, in some embodiments, have from 3 to 10 ring carbon atoms.

The term "nonionic" refers to being free of ionic groups (e.g., salts) or groups (e.g., —CO₂H, —SO₃H, —OSO₃H, —P(=O)(OH)₂) that are readily ionized in water.

The term "polymer" refers to a molecule having a structure which essentially includes the multiple repetition of units derived, actually or conceptually, from molecules of low relative molecular mass.

The term "fluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

All numerical ranges are inclusive of their endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
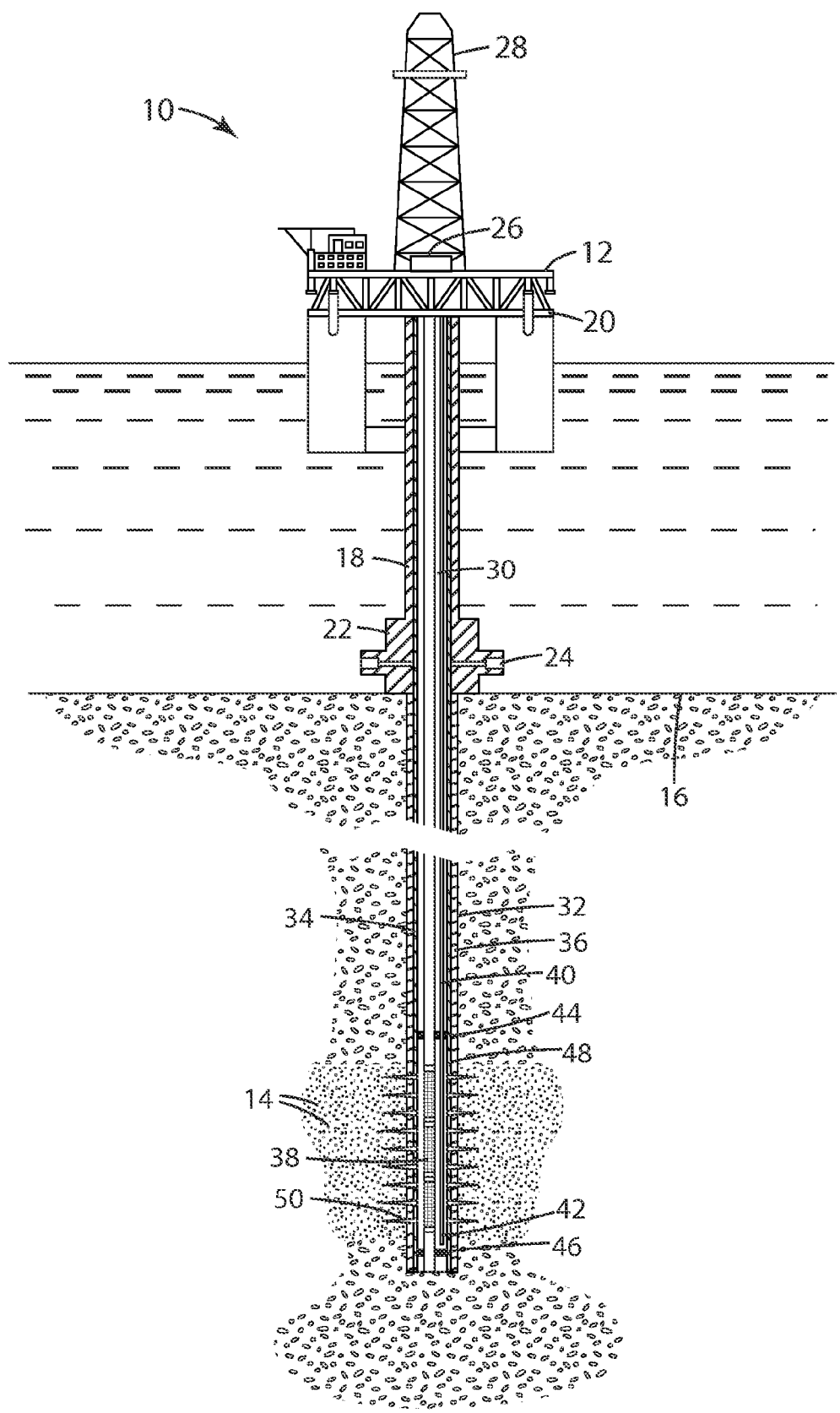
FIG. 1 is a schematic illustration of an exemplary embodiment of an offshore oil platform operating an apparatus for progressively treating a near wellbore region according to the present disclosure.

Methods according to the present disclosure include contacting a hydrocarbon-bearing formation with a polymer described herein. The polymer useful for these methods and present in the resulting treated hydrocarbon-bearing formations or proppant particles comprises divalent units represented by formula:

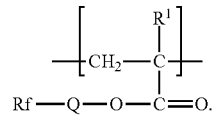

Rf is independently fluoroalkyl having up to 10, 8, 6, or even up to 4 carbon atoms (e.g., in a range from 2 to 10, 2 to 8, 4 to 10, 4 to 8, 6 to 10, or 2 to 6 carbon atoms). R¹ is independently hydrogen or alkyl having up to 4 carbon atoms (e.g., methyl, ethyl, n-propyl, isopropyl, n-butyl, or isobutyl). In some embodiments, R¹ is independently hydrogen or methyl. Q is independently alkylene having up to 10 carbon atoms and optionally interrupted by at least one —O— (e.g., methylene, ethylene, propylene, butylene, pentylene, hexylene, heptylene, octylene, nonylene, decylene, or —(CH₂—CH₂—O)ₘ—CH₂—CH₂—, wherein m is an integer having a value from 1 to 4 (i.e., 1, 2, 3, or 4). In some embodiments, Q is —CH₂—CH₂—O—CH₂—CH₂— or —CH₂—CH₂—. In some embodiments, Q is —CH₂—CH₂—O—CH₂—CH₂—. In some embodiments, Q is methylene or ethylene.

In some embodiments of the methods and hydrocarbon-bearing formations disclosed herein, divalent units represented by formula:

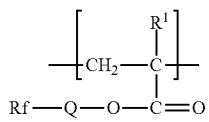

are present in the polymer in a range from 5 to 75, 5 to 60, 5 to 55, 5 to 50, 5 to 45, 10 to 75, 10 to 60, 10 to 55, 10 to 50, 10 to 45, 15 to 75, 15 to 60, 15 to 55, 15 to 50, 15 to 45, or even 15 to 40 percent by weight, based on the total weight of the polymer. In some embodiments, the polymer has at least 2, 3, 4, 5, 10, 15, or even at least 20 of these divalent units. In some embodiments, the polymer has up to 100, 150, 200, 250, 300, 350, or 400 of these divalent units.

Polymers useful for practicing the present disclosure also comprise a plurality (i.e., multiple) of alkyleneoxy groups having from 2 to 4 or 2 to 3 carbon atoms (e.g., —$CH_2CH_2O$—, —$CH(CH_3)CH_2O$—, —$CH_2CH(CH_3)O$—, —$CH_2CH_2CH_2O$—, —$CH(CH_2CH_3)CH_2O$—, —$CH_2CH(CH_2CH_3)O$—, or —$CH_2C(CH_3)_2O$—). In some embodiments, the polymers comprise a plurality of groups having formula —$CH_2CH_2O$—. The plurality of alkyleneoxy groups (e.g., ethoxy, propoxy, or combinations thereof) may be present in a series of repeating (i.e., polymerized) alkylene oxide units. The series of repeating alkylene oxide units may have a number average molecular weight of at least 200, 300, 500, 700, or even at least 1000 grams per mole up to 2000, 4000, 5000, 8000, 10000, 15,000, or even up to 20000 grams per mole. Two or more differing alkyleneoxy groups may be distributed randomly in the series or may be present in alternating blocks.

In some embodiments of the methods and the hydrocarbon-bearing formations according to the present disclosure, at least a portion of the plurality of alkyleneoxy groups is present in divalent units represented by formula:

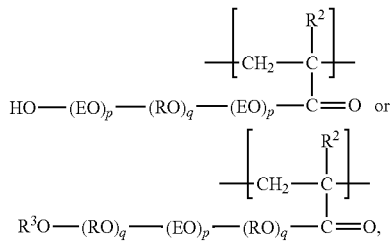

wherein $R^2$ and $R^3$ are each independently hydrogen or alkyl having up to 4 carbon atoms (e.g., methyl, ethyl, n-propyl, isopropyl, n-butyl, or isobutyl). In some embodiments, $R^2$ and $R^3$ are each independently hydrogen or methyl. In some embodiments, at least a portion of the plurality of alkyleneoxy groups is present in units represented by formula:

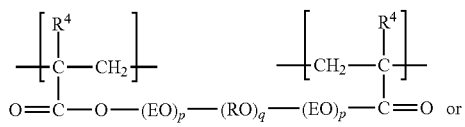

wherein each $R^4$ is independently hydrogen or alkyl having up to 4 carbon atoms (e.g., methyl, ethyl, n-propyl, isopropyl, n-butyl, or isobutyl). In some embodiments, each $R^4$ is independently hydrogen or methyl. In any of the aforementioned formulas for divalent units containing alkyleneoxy groups, EO represents —$CH_2CH_2O$—. Each RO independently represents —$CH(CH_3)CH_2O$—, —$CH_2CH_2CH_2O$—, —$CH_2CH(CH_3)O$—, —$CH(CH_2CH_3)CH_2O$—, —$CH_2CH(CH_2CH_3)O$—, or —$CH_2C(CH_3)_2O$—. In some embodiments, each RO independently represents —$CH(CH_3)CH_2O$— or —$CH_2CH(CH_3)O$—. Each p is independently an integer from 1 to about 150, and each q is independently an integer from 0 to about 55. In some embodiments, q is in a range from 1 to 55. In some embodiments, the ratio p/q has a value from at least 0.5, 0.75, 1 or 1.5 to 2.5, 2.7, 3, 4, 5, or more. In some embodiments, at least a portion of the plurality of alkyleneoxy groups is present in sulfur-terminated segments.

In some embodiments, polymers useful for practicing the present disclosure comprise:

first divalent units represented by formula:

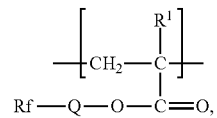

wherein Rf, $R^1$, and Q are as defined above; and
second divalent units represented by least one of

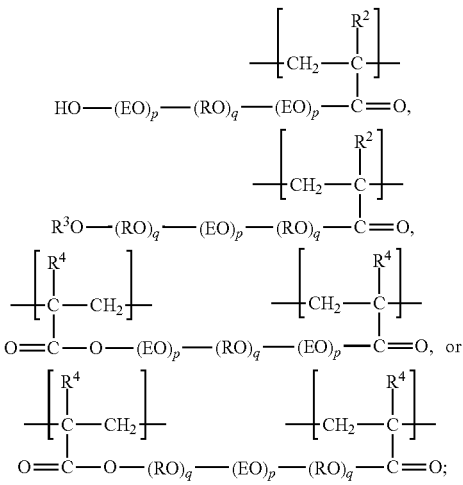

wherein $R^2$, $R^3$, $R^4$, EO, RO, p, and q are as defined above. In these embodiments, a ratio of first divalent units to second divalent units may be in a range from 2 to 0.1:1 (e.g., 2 to 1, 1.75 to 1, 1.5 to 1, 1.25 to 1, 1 to 1, 0.75 to 1, 0.5 to 1, or 0.25 to 1).

In some embodiments, polymers useful in practicing the present disclosure comprise at least one divalent unit represented by formula:

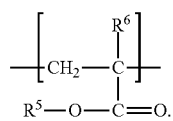

Each $R^5$ is independently alkyl having up to 8 carbon atoms (e.g., methyl, ethyl, n-propyl, isopropyl, n-butyl, iso-butyl, n-pentyl, neopentyl, hexyl, heptyl, or octyl). Each $R^6$ is independently hydrogen or methyl (in some embodiments, hydrogen).

In some embodiments, polymers useful for practicing the present disclosure may be represented by formula:

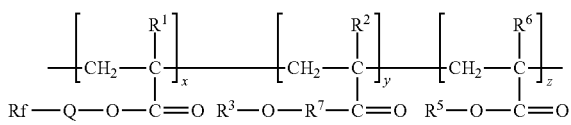

wherein Rf, $R^1$, Q, $R^2$, $R^3$, $R^5$, and $R^6$ are as defined above, $R^7$ is a poly(alkyleneoxy) segment wherein alkyleneoxy has from 2 to 4 carbon atoms, x is a value in a range from 2 to 400, y is in a range from 1 to 100, and z is in a range from 0 to 100. In this formula, the units may be distributed in any order.

In some embodiments, polymers useful for practicing the present disclosure are nonionic. In some embodiments, the polymers have at least one anionic group (e.g., $—SO_3Y$, $—O—SO_3Y$, or $—CO_2Y$).

Some polymers useful for practicing the present disclosure are commercially available (e.g., from BYK Additives and Instruments, Wesel, Germany, under the trade designation "BYK-340", from Mason Chemical Company, Arlington Heights, Ill., under the trade designation "MASURF FS-2000", and from Ciba Specialty Chemicals, Basel, Switzerland, under the trade designation "CIBA EFKA 3600"). Useful polymers can also be prepared, for example, by polymerizing a mixture of components typically in the presence of an initiator. By the term "polymerizing" it is meant forming a polymer or oligomer that includes at least one identifiable structural element due to each of the components. Typically the polymer or oligomer that is formed has a distribution of molecular weights and compositions. The polymer or oligomer may have one of many structures (e.g., a random graft copolymer or a block copolymer).

The components that are useful for preparing the polymers disclosed herein include a fluorinated free-radically polymerizable monomer independently represented by formula Rf-(Q)-O—C(O)—C($R^1$)=$CH_2$, wherein Rf, $R^1$, and Q are as defined above. Polymerizable monomers containing a plurality of alkyleneoxy groups include compounds of formulas HO—$(EO)_p$—$(ROO)_q$—$(EO)_p$—C(O)—C($R^2$)=$CH_2$, $R^{30}$—$(RO)_q$—$(EO)_p$—$(RO)_q$C(O)—C($R^2$)=$CH_2$, $CH_2$=C($R^2$)—C(O)—O—$(EO)_p$—$(RO)_q$$(EO)_p$—C(O)—C($R^2$)=$CH_2$, and $CH_2$=C($R^2$)—C(O)—O—$(RO)_q$$(EO)_p$—$(RO)_q$C(O)—C($R^2$)=$CH_2$, wherein p, q, $R^2$, $R^3$, EO, and RO are as defined above.

Some compounds of Formula Rf-Q—O—C(O)—C($R^1$)=$CH_2$, are available, for example, from commercial sources (e.g., 3,3,4,4,5,5,6,6,6-nonafluorohexyl acrylate from Daikin Chemical Sales, Osaka, Japan and 3,3,4,4,5,5,6,6,6-nonafluorohexyl 2-methylacrylate from Indofine Chemical Co., Hillsborough, N.J., and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.); others can be made by known methods (see, e.g., EP1311637 B1, published Apr. 5, 2006, the disclosure of which is incorporated herein by reference for the preparation of 2,2,3,3,4,4,4-heptafluorobutyl 2-methylacrylate).

Some useful components containing a plurality of alkyleneoxy groups are available, for example, from commercial sources. For example, diethylene glycol diacrylate, tri(ethylene glycol)dimethacrylate, and tri(ethylene glycol)divinyl ether can be obtained from general chemical suppliers (e.g., Sigma-Aldrich), and polyoxyalkylene glycol acrylates and diacrylates (e.g., $CH_2$=CHC(O)O($CH_2CH_2O)_{7-9}$H) are available from Nippon Oil & Fats Company, Tokyo, Japan under the trade designation "BLEMMER".

Compounds of formulas HO—$(EO)_p$—$(RO)_q$—$(EO)_p$—C(O)—C($R^2$)=$CH_2$ and $R^{30}$—$(RO)_q$—$(EO)_p$—$(RO)_q$C(O)—C($R^2$)=$CH_2$ can also be prepared by known methods, for example, combining acryloyl chloride or acrylic acid with a polyethylene glycol or a monoalkyl ether thereof having a molecular weight of about 200 to 10,000 grams per mole (e.g., those available from Dow Chemical Company, Midland, Mich., under the trade designation "CARBOWAX") or a block copolymer of ethylene oxide and propylene oxide having a molecular weight of about 500 to 15000 grams per mole (e.g., those available from BASF Corporation, Ludwigshafen, Germany, under the trade designation "PLURONIC"). The reaction of acrylic acid with a poly(alkylene oxide) is typically carried out in the presence of an acid catalyst and a polymerization inhibitor at an elevated temperature in a suitable solvent; (see, e.g., Example 1 of U.S. Pat. No. 3,787,351 (Olson)). Poly(alkylene oxide)s terminated at both ends by hydroxyl groups can be reacted with two equivalents of acryloyl chloride or acrylic acid to provide compounds of formulas $CH_2$=C($R^2$)—C(O)—O—$(EO)_p$—$(RO)_q$$(EO)_p$—C(O)—C($R^2$)=$CH_2$ and $CH_2$=C($R^2$)—C(O)—O—$(RO)_q$$(EO)_p$—$(RO)_q$C(O)—C($R^2$)=$CH_2$.

Polyalkyleneoxy-containing diacrylates can be treated with $H_2S$ or other sulfhydryl-containing compounds according to the methods of U.S. Pat. No. 3,278,352 (Erickson), incorporated herein by reference, to provide mercaptan-terminated polyalkyleneoxy compounds, which can react with fluorinated acrylates under free-radical polymerization conditions to provide block copolymers useful in practicing the present disclosure.

Free radical initiators such as those widely known and used in the art may be used to initiate polymerization of the components. Examples of free-radical initiators include azo compounds (e.g., 2,2'-azobisisobutyronitrile (AIBN), 2,2'-azobis (2-methylbutyronitrile), or azo-2-cyanovaleric acid); hydroperoxides (e.g., cumene, tert-butyl or tert-amyl hydroperoxide); dialkyl peroxides (e.g., di-tert-butyl or dicumylperoxide); peroxyesters (e.g., tert-butyl perbenzoate or di-tert-butyl peroxyphthalate); diacylperoxides (e.g., benzoyl peroxide or lauryl peroxide). Useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); and acylphosphine oxide derivatives and acylphosphonate derivatives (e.g., diphenyl-2,4,6-trimethylbenzoylphosphine oxide, isopropoxyphenyl-2,4,6-trimethylbenzoylphosphine oxide, or dimethyl pivaloylphosphonate). When heated or photolyzed such free-radical initiators fragment to generate free radicals which add to ethylenically unsaturated bonds and initiate polymerization.

Polymerization reactions may be carried out in any solvent suitable for organic free-radical polymerizations. The components may be present in the solvent at any suitable concentration, (e.g., from about 5 percent to about 90 percent by weight based on the total weight of the reaction mixture). Examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, diisopropyl ether), esters (e.g., ethyl acetate, butyl acetate), alcohols (e.g., ethanol, isopropyl alcohol), ketones (e.g., acetone, methyl ethyl ketone, methyl isobutyl ketone), sulfoxides (e.g., dimethyl sulfoxide), amides (e.g., N,N-dimethylformamide, N,N-dimethylacetamide), halogenated solvents (e.g., methylchloroform, 1,1,2-trichloro-1,2,2-trifluoroethane, trichloroethylene or trifluorotoluene), and mixtures thereof.

Polymerization can be carried out at any temperature suitable for conducting an organic free-radical reaction. Particular temperature and solvents for use can be selected by those skilled in the art based on considerations such as, for example, the solubility of reagents, the temperature required for the use of a particular initiator, and the molecular weight desired. While it is not practical to enumerate a particular temperature suitable for all initiators and all solvents, generally suitable temperatures are in a range from about 30° C. to about 200° C.

Free-radical polymerizations may be carried out in the presence of chain transfer agents. Typical chain transfer agents that may be used in the preparation of polymers described herein include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of a polyacrylate copolymer.

The components used in reactions to prepare polymers useful for practicing the present disclosure may include at least one of acrylic acid, methacrylic acid, itaconic acid, maleic acid, fumaric acid, β-carboxyethyl acrylate, β-carboxyethyl methacryate, or 2-acrylamido-2-methyl-1-propane sulfonic acid. The resulting polymer comprises at least one of —$SO_3Y$, —O—$SO_3Y$, or —$CO_2Y$ pendent from the polymer chain, wherein Y is hydrogen or a counter cation. The polymer is typically referred to as anionic or containing an anionic group. Exemplary Y counter cations include alkali metal ions (e.g., sodium, potassium, and lithium), ammonium, alkyl ammonium (e.g., dialkylammonium, trialkylammonium, and tetraalkylammonium wherein alkyl is optionally substituted by at least one hydroxyl, fluoride, or aryl group), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion, any of which may be partially fluorinated).

Polymers useful for practicing the present disclosure may contain other divalent units, which may comprise pendent fluorinated or non-fluorinated alkyl groups. These divalent units may be incorporated into the polymer chain by selecting additional components for the polymerization reaction such as alkyl acrylates and methacrylates (e.g., octadecyl methacrylate, lauryl methacrylate, butyl acrylate, isobutyl methacrylate, ethylhexyl acrylate, ethylhexyl methacrylate, methyl methacrylate, hexyl acrylate, heptyl methacrylate, cyclohexyl methacrylate, or isobornyl acrylate); allyl esters (e.g., allyl acetate and allyl heptanoate); vinyl ethers or allyl ethers (e.g., cetyl vinyl ether, dodecylvinyl ether, 2-chloroethylvinyl ether, or ethylvinyl ether); alpha-beta unsaturated nitriles (e.g., acrylonitrile, methacrylonitrile, 2-chloroacrylonitrile, 2-cyanoethyl acrylate, or alkyl cyanoacrylates); alpha-beta-unsaturated carboxylic acid derivatives (e.g., allyl alcohol, allyl glycolate, acrylamide, methacrylamide, n-diisopropyl acrylamide, or diacetoneacrylamide), styrene and its derivatives (e.g., vinyltoluene, alpha-methylstyrene, or alpha-cyanomethyl styrene); olefinic hydrocarbons which may contain at least one halogen (e.g., ethylene, propylene, isobutene, 3-chloro-1-isobutene, butadiene, isoprene, chloro and dichlorobutadiene, 2,5-dimethyl-1,5-hexadiene, and vinyl and vinylidene chloride); and hydroxyalkyl-substituted polymerizable compounds (e.g., 2-hydroxyethyl methacrylate). Other divalent units containing pendent fluorinated groups include those derived from vinyl ethers, vinyl esters, allyl esters, vinyl ketones, styrene, vinyl amide, and acrylamides.

Polymers useful for practicing the present disclosure may have weight average molecular weights, for example, of about 1000 grams per mole up to about 50,000, 60,000, 70,000, 80,000, 90,000, 100,000, 120,000, 140,000, 160,000, 180,000 or even 200,000 grams per mole, although higher molecular weights may be useful for some embodiments. In some embodiments, polymers useful in practicing the present disclosure have a weight average molecular weight of at least 35,000 grams per mole.

In some embodiments, polymers useful in practicing the methods disclosed herein are free of silane groups (i.e., a group having at least one Si—O—Z moiety, wherein Z is H or substituted or unsubstituted alkyl or aryl). The absence of silane groups may be advantageous, for example, because silane groups may undergo hydrolysis and form polysiloxanes in the presence of some brines and at some temperatures when delivering the polymer to a geological zone.

Typically, in compositions useful for practicing the methods described herein, the fluorinated polymer is present in the composition at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the composition. For example, the amount of the fluorinated polymer in the compositions may be in a range from 0.01 to 10, 0.1 to 10, 0.1 to 5, 1 to 10, or even in a range from 1 to 5 percent by weight, based on the total weight of the composition. Lower and higher amounts of the fluorinated polymer in the compositions may also be used, and may be desirable for some applications.

Compositions useful in practicing the methods disclosed herein typically comprise solvent. As used herein, the term "solvent" refers to a homogeneous liquid material (inclusive of any water with which it may be combined) that is capable of at least partially dissolving a fluorinated polymer disclosed herein at 25° C. Examples of useful solvents include organic solvents, water, and combinations thereof. In some embodiments, the compositions are essentially free of water (i.e., contain less than 0.1 percent by weight of water, based on the total weight of the composition). In some embodiments, the solvent is a water-miscible solvent (i.e., the solvent is soluble in water in all proportions). Examples of polar and/or water-miscible solvents include monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or polypropylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments, the solvent comprises at least one of a polyol or polyol ether independently having from 2 to 25 (in some embodiments, 2 to 15, 2 to 10, 2 to 9, or even 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or even 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 9, 3 to 8, or even from 5 to 8 carbon atoms. In some embodiments, the polyol is at least one of ethylene glycol, propylene glycol, polypropylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment.

In some embodiments, useful solvents for practicing the methods disclosed herein comprise at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the methods disclosed herein, the compositions comprise at least two organic solvents. In some embodiments, the compositions comprise at least one of a polyol or polyol ether independently having from 2 to 25 (in some embodiments, 2 to 15, 2 to 10, 2 to 9, or even 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol methyl ether may be a polyol ether or a monohydroxy alcohol, but not as both simultaneously. In these embodiments, each solvent component may be present as a single component or a mixture of components. In some embodiments, compositions useful for practicing the methods disclosed herein comprise at least one of a polyol or polyol ether independently having from 2 to 25 (in some embodiments, 2 to 15, 2 to 10, 2 to 9, or even 2 to 8) carbon atoms and at least one monohydroxy alcohol having up to 4 carbon atoms. In some embodiments, the solvent consists essentially of (i.e., does not contain any components that materially affect brine solubilizing or displacement properties of the composition under downhole conditions) at least one of a polyol having from 2 to 25 (in some embodiments, 2 to 20, 2 to 15, 2 to 10, 2 to 9, 2 to 8, or even 2 to 6) carbon atoms or polyol ether having from 3 to 25 (in some embodiments, 3 to 20, 3 to 15, 3 to 10, 3 to 9, 3 to 8, or even from 5 to 8) carbon atoms, and at least one monohydroxy alcohol having from 1 to 4 carbon atoms, ether having from 2 to 4 carbon atoms, or ketone having from 3 to 4 carbon atoms.

In some embodiments of methods according to the present disclosure, useful solvents at least one of at least partially solubilize or at least partially displace brine in the hydrocarbon-bearing formation. In some embodiments, useful solvents at least partially solubilize the brine. In some embodiments, useful solvents at least partially displace the brine. In some embodiments of the methods according to the present disclosure, the brine has at least 10,000, 20,000, 25,000, 30,000, 40,000, 50,000, 60,000, 70,000, 80,000, 90,000, or even at least 100,000 parts per million dissolved salt, based on the total weight of the brine. Typically, the solvents disclosed herein are capable of solubilizing more brine in the presence of a fluorinated polymer than methanol, ethanol, propanol, or butanol alone. In some embodiments of the methods disclosed herein, the solvent comprises up to 50, 40, 30, 20, or even 10 percent by weight of a monohydroxy alcohol having up to 4 carbon atoms, based on the total weight of the composition.

For any of the embodiments wherein the compositions useful for practicing the methods disclosed herein comprise at least one of a polyol or polyol ether independently having from 2 to 25 (in some embodiments, 2 to 15, 2 to 10, 2 to 9, or even 2 to 8) carbon atoms, the polyol or polyol ether is present in the composition at least 50, 55, 60, or 65 percent by weight and up to 75, 80, 85, or 90 percent by weight, based on the total weight of the composition.

For any of the embodiments wherein the compositions useful for practicing the methods disclosed herein comprise at least two organic solvents, the solvents may be those, for example, shown in Table 1, below, wherein the exemplary parts by weight are based on the total weight of solvent.

TABLE 1

| SOLVENT 1 (parts by weight) | SOLVENT 2 (parts by weight) |
|---|---|
| 1,3-propanediol (80) | isopropanol (IPA) (20) |
| propylene glycol (PG) (70) | IPA (30) |
| PG (90) | IPA (10) |
| PG (80) | IPA (20) |
| ethylene glycol (EG) (50) | ethanol (50) |
| EG (70) | ethanol (30) |
| propylene glycol monobutyl ether (PGBE) (50) | ethanol (50) |
| PGBE (70) | ethanol (30) |

TABLE 1-continued

| SOLVENT 1 (parts by weight) | SOLVENT 2 (parts by weight) |
|---|---|
| dipropylene glycol monomethyl ether (DPGME) (50) | ethanol (50) |
| DPGME (70) | ethanol (30) |
| diethylene glycol monomethyl ether (DEGME) (70) | ethanol (30) |
| triethylene glycol monomethyl ether (TEGME) (50) | ethanol (50) |
| TEGME (70) | ethanol (30) |
| 1,8-octanediol (50) | ethanol (50) |
| PG (70) | tetrahydrofuran (THF) (30) |
| PG (70) | acetone (30) |
| PG (70) | methanol (30) |
| PG (60) | IPA (40) |
| 2-butoxyethanol (BE) (80) | ethanol (20) |
| BE (70) | ethanol (30) |
| BE (60) | ethanol (40) |
| PG (70) | ethanol (30) |
| EG (70) | IPA (30) |
| glycerol (70) | IPA (30) |

The amount of solvent typically varies inversely with the amount of other components in compositions useful in practicing any of the methods disclosed herein. For example, based on the total weight of the composition the solvent may be present in the composition in an amount from at least 10, 20, 30, 40, or 50 percent by weight or more up to 60, 70, 80, 90, 95, 98, or even 99 percent by weight, or more.

The ingredients for compositions described herein including fluorinated polymers, solvent, and optionally water can be combined using techniques known in the art for combining these types of materials, including using conventional magnetic stir bars or mechanical mixer (e.g., in-line static mixer and recirculating pump). Some commercially available fluorinated polymers useful for practicing the present disclosure (e.g., the fluorinated polymer available from BYK Additives and Instruments under the trade designation "BYK-340") are sold as diluted solutions in at least one of solvent or water. These solutions may be used directly in the compositions described herein so that the diluting solvent or water becomes part of the composition, or the diluting solvent or water may be removed (e.g., distilled or evaporated) before making the composition.

Generally, the amounts of the fluorinated polymer and solvent (and type of solvent) is dependent on the particular application since conditions typically vary between wells, at different depths of individual wells, and even over time at a given location in an individual well. Advantageously, treatment methods according to the present disclosure can be customized for individual wells and conditions.

Although not wanting to be bound by theory, it is believed the effectiveness of the methods disclosed herein for improving hydrocarbon productivity of a particular oil and/or gas well having brine accumulated in the near wellbore region will typically be determined by the ability of the composition to dissolve the quantity of brine present in the near wellbore region of the well while delivering the polymer to the well. Hence, at a given temperature greater amounts of compositions having lower brine solubility (i.e., compositions that can dissolve a relatively lower amount of brine) will typically be needed than in the case of compositions having higher brine solubility and containing the same fluorinated polymer at the same concentration.

It is believed that methods according to the present disclosure will provide more desirable results when the composition is homogeneous at the temperature(s) encountered in the hydrocarbon-bearing formation. In some embodiments of the methods according to the present disclosure, the composition comprises a nonionic polymer, the hydrocarbon-bearing formation has a temperature, and when the composition initially contacts the formation, the nonionic polymer has a cloud point that is above the temperature of the formation. The term "cloud point" refers to the temperature at which the fluorinated polymer becomes non-homogeneous in the composition. This temperature can depend on many variables (e.g., concentration of the fluorinated polymer, solvent composition, brine concentration and composition, hydrocarbon concentration and composition, and the presence of other components (e.g., surfactants)).

In some embodiments, when the composition is contacting the hydrocarbon-bearing formation, the formation is substantially free of precipitated salt. As used herein, the term "substantially free of precipitated salt" refers to an amount of salt that does not interfere with the ability of the composition (or the fluorinated polymer) to increase the gas permeability of the hydrocarbon-bearing formation. In some embodiments, "substantially free of precipitated salt" means that no precipitated salt can be visually observed. In some embodiments, "substantially free of precipitated salt" is an amount of salt that is less than 5% by weight higher than the solubility product at a given temperature and pressure.

In some embodiments of methods according to the present disclosure, combining the composition and the brine of the hydrocarbon-bearing formation at the temperature of the hydrocarbon-bearing formation does not result in the phase separation of the fluorinated polymer or salt precipitation. In some of these embodiments, the combination of the composition and the brine may appear clear, slightly hazy, or hazy. Phase behavior can be evaluated prior to contacting the hydrocarbon-bearing formation with the composition by obtaining a sample of the brine from the formation and/or analyzing the composition of the brine from the formation and preparing an equivalent brine having the same or similar composition to the composition of the brine in the formation. The brine saturation level in a hydrocarbon-bearing formation can be determined using methods known in the art and can be used to determine the amount of brine that can be mixed with the fluorinated polymer-solvent composition. The brine and the composition (i.e., the fluorinated polymer-solvent composition) can be combined (e.g., in a container) at the temperature and then mixed together (e.g., by shaking or stirring). The mixture is then maintained at the temperature for 15 minutes, removed from the heat, and immediately visually evaluated to see if phase separation or salt precipitation occurs.

The phase behavior of the composition and the brine can be evaluated over an extended period of time (e.g., 1 hour, 12 hours, 24 hours, or longer) to determine if any phase separation, precipitation, or cloudiness is observed. By adjusting the relative amounts of brine and the fluorinated polymer-solvent composition, it is possible to determine the maximum brine uptake capacity (above which phase separation occurs) of the fluorinated polymer-solvent composition at a given temperature. Varying the temperature at which the above procedure is carried out typically results in a more complete understanding of the suitability of fluorinated polymer-solvent compositions as treatment compositions for a given well. In some embodiments, the amount of brine that can be added to a composition before phase separation or salt precipitation occurs is at least 5, 10, 15, 20, 25, 30, 35, 40, 45, or even at least 50 percent by weight, based on the total weight of brine and fluorinated polymer-solvent composition combined in the phase behavior evaluation.

Although not wishing to be bound by theory, it is believed that once the composition contacts a hydrocarbon-bearing formation (e.g., a siliciclastic formation) or a plurality of proppants in a fractured hydrocarbon-bearing formation (e.g., downhole), the environment will cause the fluorinated polymer to become less soluble in the composition over time and adsorb onto the formation or at least a portion of the plurality of proppants. In some embodiments, the hydrocarbon-bearing formation is siliciclastic (in some embodiments, at least 50 percent by weight sandstone), and the polymer is adsorbed on the hydrocarbon-bearing siliciclastic formation. In some embodiments, the polymer is adsorbed on at least a portion of the plurality of proppants. Once adsorbed onto the formation, the fluorinated polymer can modify the wetting properties of the formation and cause an increase in at least one of the gas or oil permeabilities in the formation. When the fluorinated polymer is adsorbed on at least a portion of the plurality of proppants in a fracture, the fluorinated polymer can modify the wetting properties of the proppants and cause an increase in the conductivity of the fracture.

In some embodiments of the present disclosure, the hydrocarbon-bearing formation has a gas permeability, and contacting the formation with the composition provides an increase in the gas permeability of the formation. In some embodiments, the gas permeability after contacting the hydrocarbon-bearing formation with the composition is increased by at least 5 percent (in some embodiments, by at least 10, 15, 20, 30, 40, 50, 60, 70, 80, 90, or even 100 percent or more) relative to the gas permeability of the formation before contacting the formation with the composition. In some embodiments, the gas permeability is a gas relative permeability.

In some embodiments, methods according to the present disclosure have been found to increase the gas permeability of a core sample to a unexpectedly greater extent than analogous methods using an acrylate copolymer composition comprising a perfluorooctanesulfonamido group (e.g., methods described in U.S. Pat. Appl. No. US2008/0051551 (Pope et al.)). In some embodiments, contacting the formation with the composition provides an increase in the gas permeability of the formation that is at least 10 (in some embodiments, at least 20, 30, 40, or even at least 50) percent greater than an increase in gas permeability provided by contacting an equivalent hydrocarbon-bearing formation having brine with a comparative composition, wherein the comparative composition is the same as the composition except that the polymer is replaced with a nonionic fluorinated polymer comprising divalent units represented by formula:

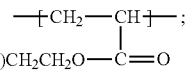

and a plurality of alkyleneoxy groups having from 2 to 4 carbon atoms. The term "equivalent hydrocarbon-bearing formation having brine" refers to a hydrocarbon-bearing formation that is similar to or the same (e.g., in chemical make-up, surface chemistry, brine composition, and hydrocarbon composition) as a hydrocarbon-bearing formation having brine disclosed herein before it is treated with a method according to the present disclosure. In some embodiments, both the hydrocarbon-bearing formation and the equivalent hydrocarbon-bearing formation are siliciclastic formations, in some embodiments, greater than 50 percent sandstone. In some embodiments, the hydrocarbon-bearing formation and the equivalent hydrocarbon-bearing formation may have the same or similar pore volume and porosity (e.g., within 15 percent, 10 percent, 8 percent, 6 percent, or even within 5 percent).

In some embodiments of the present disclosure, the hydrocarbon-bearing formation has liquid hydrocarbons (e.g., at least one of retrograde gas condensate or oil). In some embodiments, the hydrocarbon-bearing formation has retrograde gas condensate (e.g., at least one of methane, ethane, propane, butane, pentane, hexane, heptane, or octane). In some embodiments, the liquid (e.g., oil or condensate) permeability in the hydrocarbon-bearing formation is increased (in some embodiments, by at least 5, 10, 15, 20, 30, 40, 50, 60, 70, 80, 90, or even 100 percent or more) after contacting the formation with the composition. In some embodiments, solvents useful for practicing the present disclosure at least partially solubilize or at least partially displace the liquid hydrocarbons in the hydrocarbon-bearing formation. In some embodiments, useful solvents at least partially solubilize the liquid hydrocarbons. In some embodiments, useful solvents at least partially displace the liquid hydrocarbons.

Practicing the present disclosure may be useful, for example, in hydrocarbon-bearing formations, wherein two phases (i.e., a gas phase and an oil phase) of the hydrocarbons are present, (e.g., in gas wells having retrograde condensate and oil wells having black oil or volatile oil), and may result in an increase in permeability of at least one of gas, oil, or condensate. The term "black oil" refers to the class of crude oil typically having gas-oil ratios (GOR) less than about 2000 scf/stb (356 m³/m³). For example, a black oil may have a GOR in a range from about 100 (18), 200 (36), 300 (53), 400 (71), or even 500 scf/stb (89 m³/m³) up to about 1800 (320), 1900 (338), or even 2000 scf/stb (356 m³/m³). The term "volatile oil" refers to the class of crude oil typically having a GOR in a range between about 2000 and 3300 scf/stb (356 and 588 m³/m³). For example, a volatile oil may have a GOR in a range from about 2000 (356), 2100 (374), or even 2200 scf/stb (392 m³/m³) up to about 3100 (552), 3200 (570), or even 3300 scf/stb (588 m³/m³).

Methods according to the present disclosure may be practiced, for example, in a laboratory environment (e.g., on a core sample (i.e., a portion) of a hydrocarbon-bearing formation) or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to formations having these conditions. The skilled artisan, after reviewing the instant disclosure, will recognize that various factors may be taken into account in practice of the any of the disclosed methods including, for example, the ionic strength of the brine, pH (e.g., a range from a pH of about 4 to about 10), and the radial stress at the wellbore (e.g., about 1 bar (100 kPa) to about 1000 bars (100 MPa)).

In the field, contacting a hydrocarbon-bearing formation with a composition described herein can be carried out using methods (e.g., by pumping under pressure) well known to those skilled in the oil and gas art. Coil tubing, for example, may be used to deliver the treatment composition to a particular geological zone of a hydrocarbon-bearing formation. In some embodiments of practicing the methods described herein it may be desirable to isolate a geological zone (e.g., with conventional packers) to be contacted with the composition.

Practicing the present disclosure may be useful, for example, on both existing and new wells. Typically, it is believed to be desirable to allow for a shut-in time after compositions described herein contact the hydrocarbon-bearing formations. Exemplary set in times include a few hours (e.g., 1 to 12 hours), about 24 hours, or even a few (e.g., 2 to 10) days. After the composition has been allowed to remain in place for a selected time, the solvents present in the composition may be recovered from the formation by simply pumping fluids up tubing in a well as is commonly done to produce fluids from a formation.

In some embodiments of methods according to the present disclosure, the method comprises contacting the hydrocarbon-bearing formation with a fluid prior to contacting the formation with the composition, wherein the fluid at least one of at least partially solubilizes or at least partially displaces the brine in the formation. In some embodiments, the fluid at least partially solubilizes the brine. In some embodiments, the fluid at least partially displaces the brine. In some embodiments, the fluid is substantially free of fluorinated polymers. The term "substantially free of fluorinated polymers" refers to fluid that may have a fluorinated polymer in an amount insufficient for the fluid to have a cloud point (e.g., when it is below its critical micelle concentration). A fluid that is substantially free of fluorinated polymers may be a fluid that has a fluorinated polymer but in an amount insufficient to alter the wettability of, for example, a hydrocarbon-bearing formation or proppants under downhole conditions. A fluid that is substantially free of fluorinated polymers includes those that have a weight percent of such polymers as low as 0 weight percent. The fluid may be useful for decreasing the concentration of at least one of the salts present in the brine prior to introducing the composition to the hydrocarbon-bearing formation. The change in brine composition may change the results of a phase evaluation (e.g., the combination of a composition with a first brine prior to the fluid preflush may result in phase separation or salt precipitation while the combination of the composition with the brine after the fluid preflush may result in no phase separation or salt precipitation.) In some embodiments, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 (in some embodiments, 2 to 15, 2 to 10, 2 to 9, or even 2 to 8) carbon atoms. In some embodiments, useful polyols have 2 to 25, 2 to 20, 2 to 15, 2 to 10, 2 to 8, or even 2 to 6 carbon atoms. Exemplary useful polyols include ethylene glycol, propylene glycol, polypropylene glycol), 1,3-propanediol, trimethylolpropane, glycerol, pentaerythritol, and 1,8-octanediol. In some embodiments, useful polyol ethers may have from 3 to 25 carbon atoms, 3 to 20, 3 to 15, 3 to 10, 3 to 9, 3 to 8, or even from 5 to 8 carbon atoms. Exemplary useful polyol ethers include diethylene glycol monomethyl ether, ethylene glycol monobutyl ether, dipropylene glycol monomethyl ether, 2-butoxyethanol, and 1-methoxy-2-propanol. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments, the fluid at least one of partially solubilizes or displaces liquid hydrocarbons in the hydrocarbon-bearing formation.

In some embodiments of the present disclosure, the hydrocarbon-bearing formation has at least one fracture. In some embodiments, fractured formations have at least 2, 3, 4, 5, 6, 7, 8, 9, or even 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments of the present disclosure, wherein contacting the formation with the composition provides an increase in at least one of the gas permeability or the liquid hydrocarbon permeability of the formation, the formation is a non-fractured formation (i.e., free of man-made fractures).

In some embodiments of the present disclosure, wherein the hydrocarbon-bearing formation has at least one fracture, the fracture has a plurality of proppants therein. Prior to delivering the proppants into a fracture, the proppants may be treated with a fluorinated polymer (e.g., with a polymer disclosed herein) or may be untreated (e.g., may comprise less than 0.1% by weight fluorinated polymer, based on the total weight of the plurality of proppants). Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Proppants according to and/or useful in practicing the present disclosure may have a particle size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

In some embodiments, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore/formation as part of a sand control treatment such as a gravel pack or frac pack.

In some embodiments, methods according to the present disclosure include contacting the hydrocarbon-bearing formation with the composition at least one of during fracturing or after fracturing the hydrocarbon-bearing formation.

In some embodiments of methods of treating fractured formations, the amount of the composition introduced into the fractured formation (i.e., after fracturing) is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be contacted with the treatment composition.

In some embodiments, wherein the formation treated according to the methods described herein has at least one fracture, the fracture has a conductivity, and after the composition contacts at least one of the fracture or at least a portion of the plurality of proppants, the conductivity of the fracture is increased (e.g., by 25, 50, 75, 100, 125, 150, 175, 200, 225, 250, 275, or even by 300 percent). In some embodiments, the fractured hydrocarbon-bearing formation has a fracture with a conductivity, wherein contacting the proppants with the polymer provides an increase in the conductivity of the fracture (e.g., by 25, 50, 75, 100, 125, 150, 175, 200, 225, 250, 275, or even by 300 percent).

In some embodiments treated proppants disclosed herein may be prepared by contacting a hydrocarbon-bearing formation with a composition disclosed herein. Treated proppants according to the present disclosure may also be prepared, for example, by dissolving or dispersing the polymer in a dispersing medium (e.g., water and/or organic solvent (e.g., alcohols, ketones, esters, alkanes and/or fluorinated solvents (e.g., hydrofluoroethers and/or perfluorinated carbons)) that is then applied to the particles. The amount of liquid medium used should be sufficient to allow the solution or dispersion to generally evenly wet the proppants being treated. Typically, the concentration of the polymer in the solution or dispersion is the range from about 5% to about 20% by weight, although amounts outside of this range may also be useful. The proppants are typically treated with the polymer solution or dispersion at temperatures in the range from about 25° C. to about 50° C., although temperatures outside of this range may also be useful. The treatment solution or dispersion can be applied to the proppants using techniques known in the art for applying solutions or dispersions to proppants (e.g., mixing the solution or dispersion and proppants in a vessel (in some embodiments under reduced pressure) or spraying the solutions or dispersions onto the particles). After application of the treatment solution or dispersion to the particles, the liquid medium can be removed using techniques known in the art (e.g., drying the particles in an oven). Typically, about 0.1 to about 5 (in some embodiments, for example, about 0.5 to about 2) percent by weight polymer is added to the particles, although amounts outside of this range may also be useful.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Advantages and embodiments of the methods disclosed herein are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight. In the Tables, "nd" means not determined.

EXAMPLES

Fluorinated Polymers and Comparative Materials

Fluorinated Polymer 1 was a nonionic fluorinated polymer obtained as a 10% solids solution in dipropylene glycol monomethyl ether from BYK Additives and Instruments, Wesel, Germany, under the trade designation "BYK-340".

Fluorinated Polymer 2 was nonionic fluorinated polymer obtained from obtained from Ciba Specialty Chemicals, Basel, Switzerland, under the trade designation "CIBA EFKA 3600".

Comparative Fluorinated Polymer 3 was a nonionic fluorinated polymer comprising perfluorooctanesulfonamido groups prepared as described in Example 1 of U.S. Pat. No. 3,787,351 (Olson), the disclosure of which example is incorporated herein by reference.

Comparative Fluorinated Material 4 was a nonionic fluorinated surfactant represented by formula $CF_3CF_2(CF_2CF_2)_{2-4}CH_2CH_2-O-(CH_2CH_2O)_xH$ obtained from E.I. du Pont de Nemours and Co., Wilmington, Del., under the trade designation "ZONYL FSO".

Analysis of Fluorinated Polymer 1

About 20 milliliters (mL) of Fluorinated Polymer 1 ("BYK-340") were added to several 100-mL plastic tubes having screw caps. About 60 mL to 70 mL of water was added to each of the tubes until the mixture became cloudy. The tubes were capped and placed in a centrifuge (Model "HN-SII", obtained from International Equipment Co., Needham, Mass.). The tubes were centrifuged at 2000 rpm for at least one hour, and then the supernatant liquid was decanted. The resulting oil in the tube was mixed with water and centrifuged again. The supernatant liquid was decanted to leave a viscous yellow oil. The yellow oil was removed from the tubes using a pipette and combined to provide samples for molecular weight determination and structural analyses.

The weight average and number average molecular weights of the yellow oil were determined by comparison to linear polystyrene polymer standards using gel permeation chromatography (GPC). The GPC measurements were carried out using an autosampler (Model Waters 717 obtained from Waters Corporation, Milford, Mass.), controller (Model Waters 600E) obtained from Waters Corporation), pump (Model 610 obtained from Waters Corporation) and using four 300 millimeter (mm) by 7.8 mm linear columns of 5 micrometer styrene divinylbenzene copolymer particles (obtained from Polymer Laboratories, Shropshire, UK, under the trade designation "PLGEL") with pore sizes of 10,000, 1000, 500, and 100 angstroms. An evaporative light scattering detector (Model Polymer Labs 950/14, obtained from Varian, Palo Alto, Calif.) was used at 60° C. A 50-milligram (mg) sample of the yellow oil was diluted with 10 mL of tetrahydrofuran (inhibited with 250 ppm of BHT) and filtered through a 0.45 micrometer syringe filter. A sample volume of 100 microliters was injected onto the column at ambient temperature. A flow rate of 1 mL/minute was used, and the mobile phase was tetrahydrofuran. Molecular weight calibration was performed using narrow dispersity polystyrene standards with peak average molecular weights ranging from $3.8 \times 10^5$ grams per mole to 580 grams per mole. Calibration and molecular weight distribution calculations were performed using GPC software using a third order polynomial fit for the molecular weight calibration curve. Duplicate injections were run and averaged to provide a weight average molecular weight of $5.4 \times 10^4$ grams per mole and a number average molecular weight of $1.5 \times 10^4$ grams per mole, giving a polydispersity of 3.57.

Structural analyses of Fluorinated Polymer 1 were performed on the yellow oil using nuclear magnetic resonance (NMR) spectroscopy. A portion of the yellow oil was freeze-dried to remove water in the sample. Portions of the yellow oil before and after freeze-drying were totally dissolved in either deuterated acetone (acetone-$d_6$) or deuterated chloroform (CDCl$_3$) for NMR analyses using spectrometers obtained from Varian under the trade designations "VNMRS 400" and "UNITY INOVA 500 FT-NMR" that were operated at probe temperatures ranging from 22 to 24° C. One-dimensional $^1$H-NMR, $^{19}$F-NMR, and qualitative $^{13}$C-NMR spectra were then acquired followed by the acquisition of $^{13}$C-NMR DEPT (distortionless enhancement by polarization transfer) and two-dimensional NMR analyses. The two-dimensional spectra acquired included 1) $^1$H/$^{13}$C-NMR gradient heteronuclear single quantum coherence (gHSQC) experiments, 2) $^1$H/$^{13}$C-NMR gradient heteronuclear multiple bond correlation (gH-MBC) experiments, 3) $^1$H/$^1$H homonuclear correlated spectroscopy ($^1$H-COSY) experiments, 4) $^1$H/$^1$H homonuclear total correlation spectroscopy ($^1$H-TOCSY) experiments, and 5) a $^{19}$F/$^1$H heteronuclear correlated spectroscopy ($^{19}$F/$^1$H-COSY) experiment.

Another portion of the yellow oil that was not freeze-dried was diluted in acetone-$d_6$. The solution was spiked with a small amount of a shiftless paramagnetic relaxation reagent, chromium (III) acetylacetonate [Cr(acac)$_3$], and then a quantitative $^{13}$C-NMR spectrum was acquired using a gated pulse acquisition program.

Additional portions of the yellow oil before and after freeze-drying were dissolved in acetone-$d_6$ and CDCl$_3$, respectively, and treated with trifluoroacetic anhydride (TFAA), and then additional $^1$H-NMR spectra were acquired.

After the analysis of the combined one-dimensional and two-dimensional $^1$H-NMR, $^{19}$F-NMR, and $^{13}$C-NMR spectral data, it was concluded that the yellow oil was a acrylate copolymer mixture containing a mixture of units represented by formulas (I), (II), and (III):

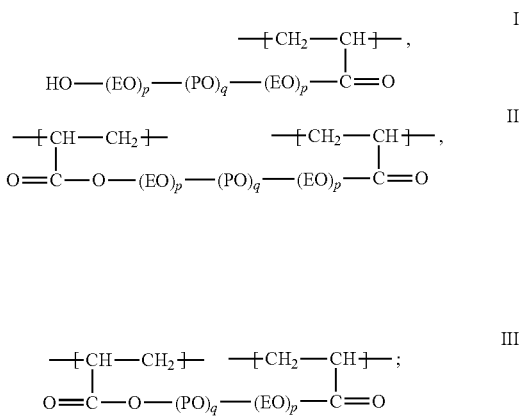

a unit represented by formula (IV):

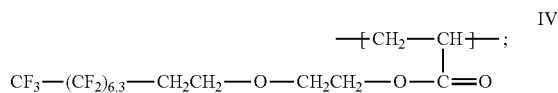

a unit represented by formula (V):

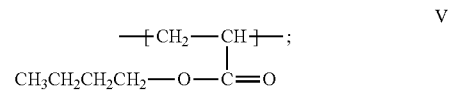

and possibly a minor amount another nonfluorinated unit. The weight ratio of units of Formulas (I), (II), and (III) to units of Formula (IV) to units of Formula (V) was about 5.7:2.6:1.

Brine

Water (92.25%) 5.9% sodium chloride, 1.6% calcium chloride, 0.23% magnesium chloride hexahydrate, and 0.05% potassium chloride were combined to provide the brine used in the Compatibility Evaluations and Examples below.

Phase Behavior Evaluations

A fluorinated polymer and solvents (Solvent A and Solvent B) were added to a vial to prepare a sample (3 grams total amount, 2% w/w of fluorinated polymer). Brine (1 gram) was added to the vial, and the vial was placed in a heated bath at 135° C. for 15 minutes. The vial was removed from the bath, and then visually inspected immediately to determine whether the sample was one phase.

The fluorinated polymer and solvents used for each Phase Behavior Evaluation are shown in Table 2 (below).

TABLE 2

| Fluorinated Polymer | Solvent A (weight %) | Solvent B (weight %) | Result |
|---|---|---|---|
| 1 | Propylene glycol (PG) (69) | Isopropanol (IPA) (29) | Very Slightly hazy, one phase |
| 2 | PG (69) | IPA (29) | Hazy, one phase |
| 3 | PG (69) | IPA (29) | One phase |
| 4 | PG (69) | IPA (29) | One phase |
| 1 | Methanol (98) | Not used | Precipitation |
| 3 | Methanol (98) | Not used | Two phases |

Example 1 and Comparative Examples A to C

Composition Preparation

A fluorinated polymer and two solvents (Solvent A and Solvent B) were combined to make 600 grams of a 2% by weight solution of the fluorinated polymer. The components were mixed together using a magnetic stirrer and magnetic stir bar. The polymers, solvents, and amounts (in wt. % based on the total weight of the composition used for Example 1 and Comparative Examples (Comp. Ex.) A to C are shown in Table 3, below.

TABLE 3

| Example | Fluorinated Polymer (wt. %) | Solvent A (wt. %) | Solvent B (wt. %) |
|---|---|---|---|
| 1 | 1 (2) | PG (69) | IPA (29) |
| Comp. Ex. A | 3 (2) | PG (69) | IPA (29) |
| Comp. Ex. B | 4 (2) | PG (69) | IPA (29) |
| Comp. Ex. C | none | PG (70) | IPA (30) |

Figure 2:
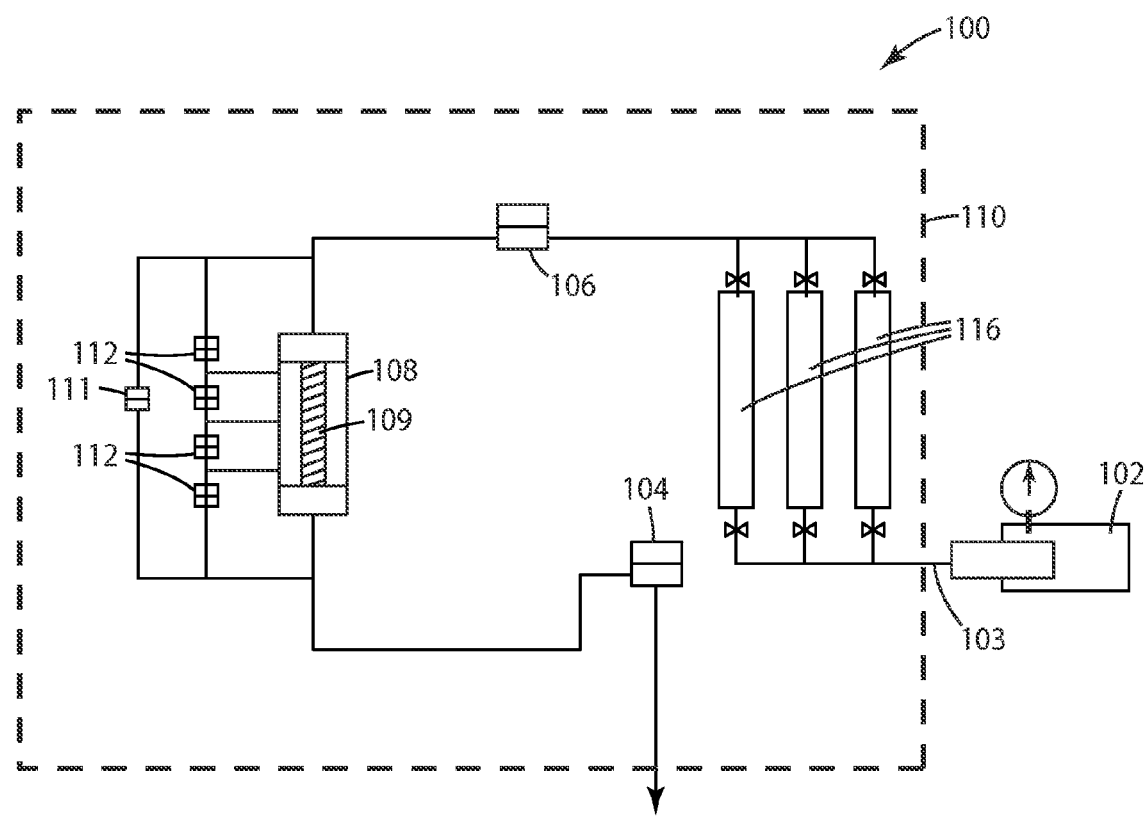
FIG. 2 is a schematic illustration of the core flood set-up used for the Examples.

Core Flood Setup:

A schematic diagram of a core flood apparatus 100 used to determine relative permeability of a substrate sample (i.e., core) is shown in FIG. 2. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1×8-3K-13 obtained from Phoenix, Houston, Tex.) were used to measure pressure drop across four sections (2 inches in length each) of core 109. An additional pressure port 111 on core holder 108 was used to measure pressure drop across the entire length (8 inches) of core 109. Two back-pressure regulators (Model No. BPR-50; obtained from Temco, Tulsa, Okla.) 104, 106 were used to control the flowing pressure upstream 106 and downstream 104 of core 109.

The flow of fluid was through a vertical core to avoid gravity segregation of the gas. High-pressure core holder 108, back pressure regulators 106, fluid accumulators 116, and tubing were placed inside a pressure- and temperature-controlled oven 110 (Model DC 1406F; maximum temperature rating of 650° F. (343° C.); obtained from SPX Corporation, Williamsport, Pa.) at 275° F. (135° C.). The maximum flow rate of fluid was 7,000 mL/hr.

Cores:

A core sample was cut from a sandstone block obtained from Cleveland Quarries, Vermillion, Ohio, under the trade designation "BEREA SANDSTONE". One core was used for each of Example 1 and Comparative Examples A to C. The properties for each of the cores used are shown in Table 4, below.

TABLE 4

| | Ex. 1 | Comp. Ex. A | Comp. Ex. B | Comp. Ex. C |
|---|---|---|---|---|
| Diameter, cm | 2.6 | 2.5 | 2.5 | 2.6 |
| Length, cm | 14.7 | 14.6 | 14.6 | 14.6 |
| Pore volume, mL | 13.5 | 13.4 | 13.4 | 15.2 |
| Porosity, % | 18.8 | 19.0 | 19.0 | 19.4 |

The porosity was measured using a gas expansion method. The pore volume is the product of the bulk volume and the porosity.

Synthetic Condensate Composition:

A synthetic gas-condensate fluid containing 93 mole percent methane, 4 mole percent n-butane, 2 mole percent n-decane, and 1 mole percent n-pentadecane was used for the core flooding evaluation. Approximate values for various properties of the fluid are reported Table 5, below.

TABLE 5

| Dewpoint, psig (Pa) | 4200 ($2.9 \times 10^7$) |
|---|---|
| Core pressure, psig (Pa) | 1500 ($1.0 \times 10^7$) |
| Liquid dropout, V/Vt % | 3.2 |
| Gas viscosity, cP | 0.017 |
| Oil viscosity, cP | 0.22 |
| Interfacial tension, dynes/cm | 5.0 |

Core Flood Procedure:

The cores described in Table 4 were dried for 72 hours in a standard laboratory oven at 95° C., and then were wrapped in aluminum foil and heat shrink tubing (obtained under the trade designation "TEFLON HEAT SHRINK TUBING" from Zeus, Inc., Orangeburg, S.C.). Referring again to FIG. 2, the wrapped core 109 was placed in core holder 108 inside oven 110 at 75° F. (24° C.). An overburden pressure of 3400 psig ($2.3 \times 10^7$ Pa) was applied. The initial single-phase gas permeability was measured using nitrogen at a flowing pressure of 1200 psig ($8.3 \times 10^6$ Pa).

The brine was introduced into the core 109 using the following procedure to establish a brine saturation of 26% (i.e., 26% of the pore volume of the core was saturated with brine). The outlet end of the core holder was connected to a vacuum pump and a full vacuum was applied for 30 minutes with the inlet closed. The inlet was connected to a burette with the brine in it. The outlet was closed and the inlet was opened to allow a known volume of brine to flow into the core. For example, a 26% brine saturation can be established by allowing 5.3 mL of brine to flow into the core having a pore volume of 20 mL before the inlet value was closed. The permeability was measured at the water saturation by flowing nitrogen at 1200 psig and 75° F. (24° C.).

Referring again to FIG. 2, the wrapped core 109 in the core holder 108 was placed inside oven 110 at 275° F. (135° C.) for several hours to allow it to reach reservoir temperature. The synthetic gas-condensate fluid described above was then introduced at a flow rate of about 690 mL/hr until steady state was established. Upstream back-pressure regulator 106 was set at about 4900 psig ($3.38 \times 10^7$ Pa), above the dew point pressure of the fluid, and downstream back-pressure regulator 104 was set at about 1500 psig ($3.38 \times 10^7$ Pa). The gas relative permeability before treatment was then calculated from the steady state pressure drop after about 200 pore volumes. The fluorinated polymer composition was then injected into the core. After at least 20 pore volumes were injected, the fluorinated polymer composition was held in the core at 275° F. (135° C.) for about 15 hours. The synthetic gas condensate fluid described above was then introduced again at a flow rate of about 690 mL/hour using positive displacement pump 102 until a steady state was reached (about 150 to 200 pore volumes). The gas relative permeability after treatment was then calculated from the steady state pressure drop. For Comparative Example C, the core was allowed to stand in the presence of the synthetic condensate compositions for about 24 hours before a second core flood of about 200 pore volumes was run. For Example 1, the core was allowed to stand in the presence of the synthetic condensate composition for about 3 hours before a second core flood of about 200 pore volumes was run.

Following the relative permeability measurements, methane gas was injected, using positive displacement pump 102, to displace the condensate and measure the final single-phase gas permeability.

For Example 1 and Comparative Examples A to C, the initial single-phase gas permeability, measured after brine saturation, the gas relative permeability before treatment with the fluorinated polymer composition, the gas relative permeability after treatment (at the times described above), the ratio of the gas relative permeabilities after and before treatment (i.e., improvement factor) are reported in Table 6, below.

TABLE 6

|  | 1 | Comp.Ex. A | Comp.Ex. B | Comp.Ex. C |
|---|---|---|---|---|
| Gas permeability, millidarcy (md) | 285.5 | 370.3 | 132.2 | 357.5 |
| Gas relative permeability before treatment | 0.057 | 0.06 | 0.064 | 0.069 |
| Gas relative permeability after treatment | 0.123/0.112 | 0.091 | 0.104 | 0.115/0.099 |
| Improvement factor | 2.16/1.96 | 1.52 | 1.63 | 1.67/1.43 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method of treating a hydrocarbon-bearing formation having brine, the method comprising:
    contacting the hydrocarbon-bearing formation having brine with a composition comprising solvent and a polymer, wherein the polymer comprises:
    a plurality of alkyleneoxy groups having from 2 to 4 carbon atoms, and
    divalent units represented by formula:

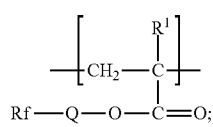

wherein
    Rf is independently fluoroalkyl having up to 10 carbon atoms;
    $R^1$ is independently hydrogen or alkyl having up to 4 carbon atoms; and
    Q is independently alkylene having up to 10 carbon atoms and optionally interrupted by at least one —O—;

wherein the brine comprises at least 10,000 parts per million of dissolved salt, and wherein the solvent at least one of solubilizes or displaces the brine in the hydrocarbon-bearing formation.

2. The method according to claim 1 wherein the polymer is a nonionic polymer.

3. The method according to claim 1, wherein the solvent comprises at least one of ethylene glycol, propylene glycol, polypropylene glycol), 1,3-propanediol, 1,8-octanediol, 2-butoxyethanol, diethylene glycol monomethyl ether, dipropylene glycol monomethyl ether, or 1-methoxy-2-propanol.

4. The method according to claim 1, wherein the solvent comprises a monohydroxy alcohol having up to 4 carbon atoms.

5. The method according to claim 1, wherein the solvent comprises up to 50 percent by weight of a monohydroxy alcohol having up to 4 carbon atoms, based on the total weight of the composition.

6. The method according to claim 1, wherein at least a portion of the plurality of alkyleneoxy groups is present in divalent units represented by formula:

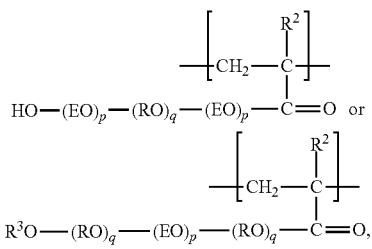

wherein
    $R^2$ and $R^3$ are each independently hydrogen or alkyl having up to 4 carbon atoms;
    EO represents —CH$_2$CH$_2$O—;
    each RO independently represents —CH(CH$_3$)CH$_2$O—, —CH$_2$CH$_2$CH$_2$O—, —CH$_2$CH(CH$_3$)O—, —CH(CH$_2$CH$_3$)CH$_2$O—, —CH$_2$CH(CH$_2$CH$_3$)O—, or —CH$_2$C(CH$_3$)$_2$O—;
    each p is independently an integer from 1 to 150; and
    each q is independently an integer from 0 to 55.

7. The method according to claim 6, wherein each RO independently represents —CH(CH$_3$)CH$_2$O— or —CH$_2$CH(CH$_3$)O—.

8. The method according to claim 1, wherein at least a portion of the plurality of alkyleneoxy groups is present in units represented by formula:

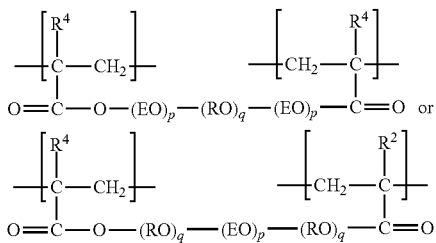

wherein
    each $R^4$ is independently hydrogen or alkyl having up to 4 carbon atoms;
    EO represents —CH$_2$CH$_2$O—;

each RO independently represents —CH(CH₃)CH₂O—, —CH₂CH₂CH₂O—, —CH₂CH(CH₃)O—, —CH(CH₂CH₃)CH₂O—, —CH₂CH(CH₂CH₃)O—, or —CH₂C(CH₃)₂O—;

each p is independently an integer from 1 to 150; and each q is independently an integer from 0 to 55.

9. The method according to claim 1, wherein at least a portion of the plurality of alkyleneoxy groups is present in thioether-terminated segments.

10. The method according to claim 1 wherein the polymer comprises a plurality of groups having formula —CH₂CH₂O—.

11. The method according to claim 1, wherein Rf is independently fluoroalkyl having up to 6 carbon atoms.

12. The method according to claim 1, wherein the weight average molecular weight of the polymer is at least 35,000 grams per mole.

13. The method according to claim 1, wherein the polymer further comprises at least one divalent unit represented by formula:

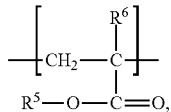

wherein
each R⁵ is independently alkyl having up to 8 carbon atoms, and
each R⁶ is independently hydrogen or methyl.

14. The method according to claim 1, further comprising contacting the hydrocarbon-bearing formation with a fluid prior to contacting the formation with the composition, wherein the fluid at least one of at least partially solubilizes or at least partially displaces the brine in the formation, and wherein the fluid is substantially free of fluorinated polymers.

15. The method according to claim 1, wherein the hydrocarbon-bearing formation is siliciclastic, and wherein the polymer is adsorbed on the hydrocarbon-bearing siliciclastic formation.

16. The method according to claim 1, wherein the hydrocarbon-bearing formation has at least one fracture, wherein the fracture has a plurality of proppants therein, and wherein the polymer is adsorbed on at least a portion of the plurality of proppants.

17. The method according to claim 1, wherein the hydrocarbon-bearing formation has a gas permeability, and wherein contacting the formation with the composition provides an increase in the gas permeability of the formation.

18. A hydrocarbon-bearing formation penetrated by a well bore, wherein a region of the hydrocarbon-bearing formation near the well bore is treated according to the method of claim 1.

19. A method of treating a hydrocarbon-bearing formation having brine, the method comprising:
contacting the hydrocarbon-bearing formation having brine with a composition comprising solvent and a polymer, wherein the polymer comprises:
a plurality of alkyleneoxy groups having from 2 to 4 carbon atoms; and
divalent units represented by formula:

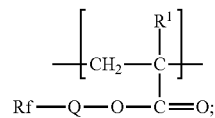

wherein
Rf is independently fluoroalkyl having up to 10 carbon atoms;
R¹ is independently hydrogen or alkyl having up to 4 carbon atoms; and
Q is independently alkylene having up to 10 carbon atoms and optionally interrupted by at least one —O—;
and wherein the solvent comprises:
at least one of a polyol or polyol ether independently having from 2 to 25 carbon atoms; and
at least one of water, a monohydroxy alcohol, an ether, or a ketone, wherein the monohydroxy alcohol, the ether, and the ketone each independently have up to 4 carbon atoms.

20. The method according to claim 19, wherein Rf is independently fluoroalkyl having up to 6 carbon atoms.

* * * * *